United States Patent [19]

Asanuma et al.

[11] Patent Number: 4,632,976

[45] Date of Patent: Dec. 30, 1986

[54] PROCESS FOR THE CONTINUOUS DISCHARGE OF A SLURRY

[75] Inventors: Tadashi Asanuma, Takaishi; Tatuo Ohoka, Izumi; Nobutaka Uchikawa, Takaishi, all of Japan

[73] Assignee: Mitsui Toatsu Chemicals, Inc., Tokyo, Japan

[21] Appl. No.: 724,635

[22] Filed: Apr. 16, 1985

[30] Foreign Application Priority Data

Apr. 16, 1984 [JP] Japan ................................. 59-74892

[51] Int. Cl.$^4$ .............................. C08F 6/00; C08F 6/24
[52] U.S. Cl. ..................................... 528/497; 528/502; 528/503; 528/493; 528/494; 528/496; 528/501
[58] Field of Search ............... 528/497, 502, 503, 493, 528/494, 496, 501

[56] References Cited

U.S. PATENT DOCUMENTS 3,285,899  11/1966  Houser et al. ...................... 528/501
3,428,619  2/1969   Hawkins et al. .................... 528/502
4,126,743  11/1978  Shiomura et al. ................... 528/493

Primary Examiner—John Kight
Assistant Examiner—M. L. Moore
Attorney, Agent, or Firm—Wenderoth, Lind & Ponack

[57] ABSTRACT

A process is provided herein wherein a solid polymer slurry diluted with a specific diluent is continuously discharged under controlled conditions from a high pressure zone to a low pressure zone substantially maintained at atmospheric pressure and the slurry is then separated into said diluent and dried polymer, the improvement wherein the discharged amount of the solid polymer slurry is strictly controlled by varying the heat in the second zone and simultaneously adding a diluent which is gaseous under normal temperature and pressure so that by the control of these two perimeters a continuous slurry discharge can be maintained at predetermined levels.

4 Claims, 2 Drawing Figures

PROCESS FOR THE CONTINUOUS DISCHARGE OF A SLURRY

BACKGROUND OF THE INVENTION

1. Field of the Invention

The present invention relates to an improvement in the process wherein a solid polymer slurry diluted with a specific diluent is continuously discharged from a high pressure zone (hereinafter called the "first zone") to a low pressure zone substantially maintained at atmospheric pressure (hereinafter called the "the second zone") and, in this discharge, the slurry is separated into said diluent and a dried polymer, the improvement wherein the discharge amount of the solid polymer slurry is strictly controlled.

2. Description of the Prior Art

Some proposals have already been made in various U.S. Patents, such as U.S. Pat. Nos. 3,285,899, 3,428,619, and 4,126,743 as to processes for continuously extracting a slurry of a solid polymer dispersed in a liquid diluent containing at least one kind of hydrocarbon(s) which are gaseous at normal temperature and under normal pressure and, at the same time, separating the diluting agent and the solid polymer.

Particularly, a proposal has been made in said U.S. Pat. No. 4,126,743 as to a process for controlling the discharge amount without relying upon any mechanical means, but enabling one to exert a wide range of control. Namely, what has been proposed is a process for controlling the discharge amount of the slurry by adjusting the quantity of heat transmitted to a heat piping into which the slurry is discharged by controlling the amount of steam introduced into heating jackets surrounding the heating pipe. Such process permits a wide range of control over said discharge and is not at all a mechanical process for controlling the discharge amount; hence it is an excellent process suitable for use on an industrial basis.

With respect to the process of U.S. Pat. No. 4,126,743, however, there are various difficulties in actually adjusting the quantity of heat involved in the steam used for heating. In other words, a large amount of steam has to be introduced and discharged in order to control the amount of heat when the control depends on the amount of steam introduced into a single heating jacket as described in FIG. 1 of said U.S. Pat. No. 4,126,743. This means that the process is not one that effectively utilizes the steam as a heat source and so it is necessary to modify the process to make it workable on an industrial scale by attaching to the system various devices to reuse or recycle the discharged steam.

In FIG. 3 of said U.S. Pat. No. 4,126,743, another embodiment of the process is shown, which embodiment is to divide the jacket for heating into two or more and effect the control by the number of the heating jackets into which the steam is to be introduced. This embodiment makes more efficient use of the steam, but involves a problem in that the variation of the discharge amount of slurry oecomes discontinuous and so strict control of the discharge amount of the slurry becomes impossible.

SUMMARY OF THE INVENTION

As a result of strenuous efforts and research to present a process that solves the above problems, the present inventors have found that strict control of the discharge amount of the slurry can be realized by dividing the heating jacket into two or more and varying the number of heating jackets into which the steam is to be introduced; and at the same time, separately, introducing liquid hydrocarbons or halogenated hydrocarbons into tne heat tube and varyrng the amount of such llquid. As a result of these achievements, the present rnvention has been completed.

(a) introducing a slurry of solid polymer particles into a heat piping or heat tube and into a first zone maintained under a pressure sufficient for holding a diluent in the liquid phase, said heat piping consisting of a heat tube covered with two or more divisional heating jackets (i.e. a series of separate or divided heating jackets into which steam is circulated therein and heat imparted to the heat tube), said diluent consisting of at least one kind of a hydrocarbon or a halogenated hydrocarbon, or mixtures thereof, which are gaseous at normal temperature and under normal pressure, and, (b) subsequently separating and recovering the substantially dried solid polymer particles and the vapor of the evaporate diluent from a second zone substantially maintained under atmospheric pressure, characterized in that the amount of slurry discharged is controlled by means of:

(i) varying the number of heating jackets to be steamed, and (ii) separately introducing an amount of liquid hydrocarbons or halogenated hydrocarbons into the heat tube; said hydrocarbons or halogenated hydrocarbons being gaseous at normal temperature and under normal pressure.

DETAILED DESCRIPTION OF THE INVENTION

Figure 1:
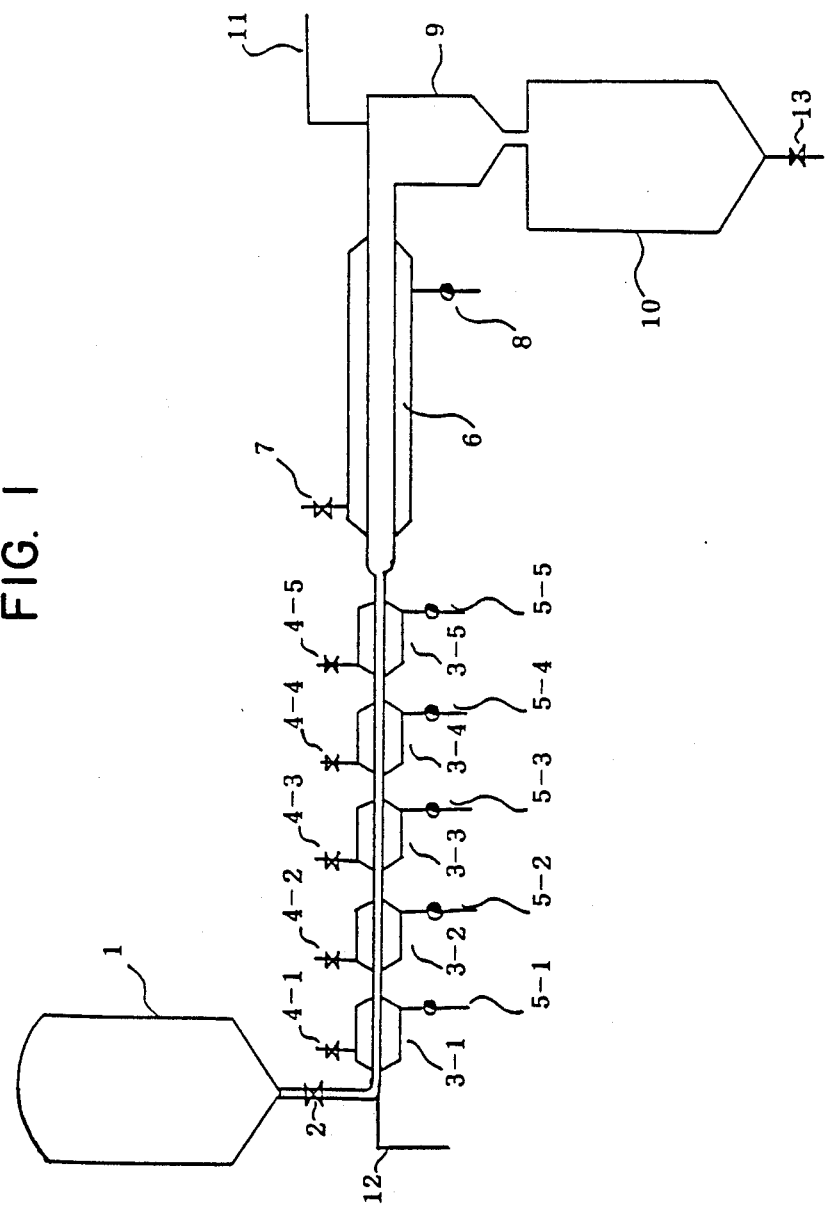
FIG. 1 is a schematic explanatory drawing relative to an example of the present invention; wherein (1) is a tank for the polymer slurry; (2), (4-1), (4-2), (4-3), (4-4), (4-5), (7) and (13) are valves; (5-1), (5-2), (5-3), (5-4), (5-5), and (8) are steam traps; (3-1), (3-2), (3-3), (3-4), (3-5) and (6) are heating jackets; (9) is a cyclone; (10) is a hopper; (11) is a vapor discharge line; (12) is an introduction line for the liquid hydrocarbons or halogenated hydrocarbons and (14) is a valve for controlling the amount of said liquid hydrocarbons or halogenated hydrocarbons.

The present invention represents an improvement over the method described in U.S. Pat. No. 4,126,743, which originated from the same assignee company as that of the present application.

As pointed out previously, U.S. Pat. No. 4,126,743 relates to a method for continuously transferring polymer slurries and particularly to a process for controlling the discharge amount of the polymer slurry without relying upon any mechanical means. According to the patented invention, a solid polymer slurry diluted with a specific diluent gaseous under normal temperature is transferred from a slurry vessel maintained at superatmospheric pressure sufficient to maintain the diluent in a liquid state, passing the polymer slurry sequentially through a first elongated and jacketed heating zone of relatively small diameter and a second elongated and jacketed heating zone having a diameter larger than that of said first heating zone, wherein the first and second heating zones are heated by heating means selected from the heat vapor of a heating medium and steam so as to vaporize the diluent for conveyance of the solid dried polymer particles.

The mixture of said vaporized diluent and said solid dried polymer particles according to the patent are then introduced into a separation zone to separate the solid polymer particles from the diluent vapor. The improvement according to the patent involves introducing said polymer slurry continuously from the slurry vessel into the first heating zone and controlling the flow rate of the polymer slurry passing through said first heating zone by regulating the amount of heat supplied to the first heating zone through heating means.

The invention of the patent employs a novel control method which avoids the use of a mechanical flow valve and is based upon certain fundamental principals. That is, according to the patented invention, the ratio of the vapor to liquid at different points in the flow path of the polymer slurry can be controlled by modifying the heat conditions along the flow path and if the mass velocity is fixed, the pressure loss across a length of section varies widely according to the ratio of vapor to liquid. Accordingly, the flow rate of the polymer slurry passing through a section across which a given pressure differential exists can be controlled by modifying the heating conditions and hence the vaporization rate of the diluent along the flow path. By use of a heat transfer medium such as steam, exhibiting a high transfer coefficient, this is especially effective to control the temperature of the fluid passing through the heating pipes.

According to the patented invention, the heating zone of relatively small diameter is heated by heating jackets as well as the second heating zone having a diameter larger than that of said first heating zone.

In a preferred embodiment, the first heating zone is subdivided into a plurality of heating subzones, preferably a series of heating jackets into which steam is supplied to transfer heat to a heating pipe as shown in FIG. 3 of U.S. Pat. No. 4,126,743, and the greater number of separate heating subzones, the more delicately the flow rate of the polymer slurry can be controlled. As pointed out in the patent, a maximum flow rate is achieved when the steam jackets are not operating, i.e. steam is not applied to the steam jackets, and the flow rate is decreased by increasing the number of heated jackets to which steam is supplied. This is because the more heat applied to said first heating zone, the greater the pressure exerted by the heated diluent, etc. which decreases the pressure differential between the vessel in which super atmospheric pressure is employed and the heating zones, which in turn decreases the amount of discharge. On the other hand, when the heating heating jackets are turned off or decreased, the diluent in the heating zones are cooled, the pressure decreases in said heating zones and the pressure differences between the vessel in which the slurry is present under super atmospheric pressure and that of the heating zones is increased, which in turn decreases the amount of discharge of the slurry.

The above is all described in U.S. Pat. No. 4,126,743 and the teachings of this patent are incorporated by reference herein.

The present invention is a variation and decided improvement in the invention of U.S. Pat. No. 4,126,743 because according to the present invention there is employed in tandem a series of heating jackets or variable heating zones in the first zone of smaller diameter tubing as in FIG. 3 of U.S. Pat. No. 4,126,743 and in addition the present process separately introduces liquid hydrocarbons or halogenated hydrocarbons which are preferably the same as the diluent used in the slurry, said hydrocarbons or halogenated hydrocarbons being gaseous at normal temperatures and under normal pressure. By separately introducing the hydrocarbons or halongenated hydrocarbons into the heating zone, this further controls the pressure in the heating zones so that between the heating jackets and the introduction of the hydrocarbons or halogenated hydrocarbons into said heating zone, the pressure in the heat tube can be can be finely tuned and overcomes the problems in the use of heating jackets alone by making it possible to continuously and strictly control the discharge amount of the slurry. According to Applicants' process, strict and precise control of the amount of discharge of the slurry becomes possible making the present invention very valuable on an industrial scale.

The object of the present invention is to present a process for continuously discharging a slurry of solid polymer particles under strict control of the discharge amount and separating and recovering the substantially dried solid polymer particles and the vapor of the evaporated diluent.

In the present invention, the solid polymer particles that form the slurry may for example be those of polyethylene, polypropylene, polybutene-1, polyvinylchloride or copolymers thereof. As for the diluent, there may be mentioned liquified gases of propane, propylene, butane, butene, vinylchloride, etc. and their mixtures, or liquid mixtures thereof with ethylene, hydrogen, etc., or the like. The above-mentioned diluent may be one that further contains another high boiling point diluent which is liquid at normal temperature and under normal pressure, such as pentane, hexane, heptane, benzene or toluene, to an extent not more than about 20% by weight. The concentration of the polymer in the slurry in tank 1 of FIG. 1 is usually 5–80% by weight, and preferably 10–50% by weight.

In the present invention, the size of the heat tube may be varied in accordance with the discharge flow amount of the polymer slurry to be processed, the kind of the diluent, the pressures of the first zone and the second zone, the concentration of the slurry of the polymer particles etc., but in order to broaden the controllable range of the slurry discharge amount, it is effective to form the heat tube with a larger inner diameter portion and a smaller inner diameter portion, the latter part being positioned at the side of the first zone, and the ratio of the different diameters being 1.2–3. Furthermore, the temperature of the heat tube or the heated second zone should not exceed the softening point of the solid polymer by more than 50° C.

The flow velocity of the polymer slurry may preferably be 3–20 m/sec at the inlet of the heat tube and 14–150 m/sec at its outlet (where however the slurry is the mixed slurry of the polymer particles and the vapor of the diluent), and the size of the heat tube should be chosen accordingly. It is desirable to set the pressure in the first zone at 10–50 kg/cm$^2$ Gauge and the pressure in the second zone at 1–7 kg/cm$^2$ Gauge.

The length and the inner diameter of the heat tube and the size of the heating jackets will have to be chosen so that the diluent may be evaporated at substantially 100% in the second zone, even when operating at the desired maximum slurry discharge velocity, and may concretely be chosen in accordance with known methods on the basis of certain physical values of the diluent, for example, such as the specific heat, the latent heat of evaporation or the like.

As to the extent of the divisions of the heating jacket, the greater the number of divisions (i.e. the more heating jackets surrounding the heat tube), the less amount of the hydrocarbons or halogenated hydrocarbons to be introduced into the heat tube for continuously changing the discharge amount of the slurry. In practice, however, the length of the individual jacket after division should be not less than about 1 m, and preferably not more than about 5 m.

In the present invention, the liquid hydrocarbons or halogenated hydrocarbons, which are gaseous at normal temperature and under normal pressure and are to be introduced separately, may be the same as those mentioned as to the diluents, and in effect it is preferable to use those used from the diluent in view of the merits of reusing the vapor separated and recovered in the second zone. By "normal" temperature or pressure is meant ambient temperature or normal atmospheric temperatures or room temperatures and pressures encountered in the earth's atmosphere, such as atmospheric pressures (14.7 lb/sq. in.) and pressures varying, depending on the altitude for example, and the temperatures varying, for example, from about $-30°$ F. to about $100°$ F.

According to the present invention, it is now possible to efficiently discharge the slurry by strictly controlling the amount of discharge of the slurry, which this is of significant industrial value.

The present invention will further be explained in detail by way of Comparative Example and working Example shown hereinafter. The Example of the present invention is designed to show a preferred embodiment and is no way to be construed as limiting the scope of the invention.

COMPARATIVE EXAMPLE

Tests on the discharge of the slurry are performed by means of the plant shown in FIG. 1 of the drawings.

The plant comprises a heat piping of 1 inch inner diameter and 80 m length having a heating jacket divided into five and a heat piping of 1½ inches inner diameter and 60 m length having one heating jacket. Each heating jacket is arranged so as to be able to receive heated steam of 1.4 kg/cm² and the flowing-in or shutting-off of the heated steam into each heating jacket can be switched by opening or closing the valves (4-1), (4-2), (4-3), (4-4), (4-5) and (7), respectively. The polymer particles and the vapor which leave the heat pipings are separated in the cyclone (9), and the vapor is discharged from (11) and the polymer particles are sent to (10).

From the tank (1) containing slurry of 45% by weight of polypropylene particles and being maintained at a temperature of 40° C. and a pressure of 14 kg/cm² Gauge, the slurry is discharged by fully opening the valve (2). The cyclone (9) is maintained at a pressure of 0.3 kg/cm² Gauge. Under such conditions that steam of 1.4 kg/cm² is supplied to all (all six) of the heating jackets as shown in FIG. 1, the number of the heating jackets to which the steam is supplied is reduced to 5, 4, 3 and 2 by closing the valves (4-1), (4-2), (4-3) and (4-4), in this order. Then the discharge amount of the slurry gradually varies from 4.9 tons/hr to 7.0 tons/hr, 8.6 tons/hr, 9.3 tons/hr and 10.3 tons/hr.

EXAMPLE

Figure 2:
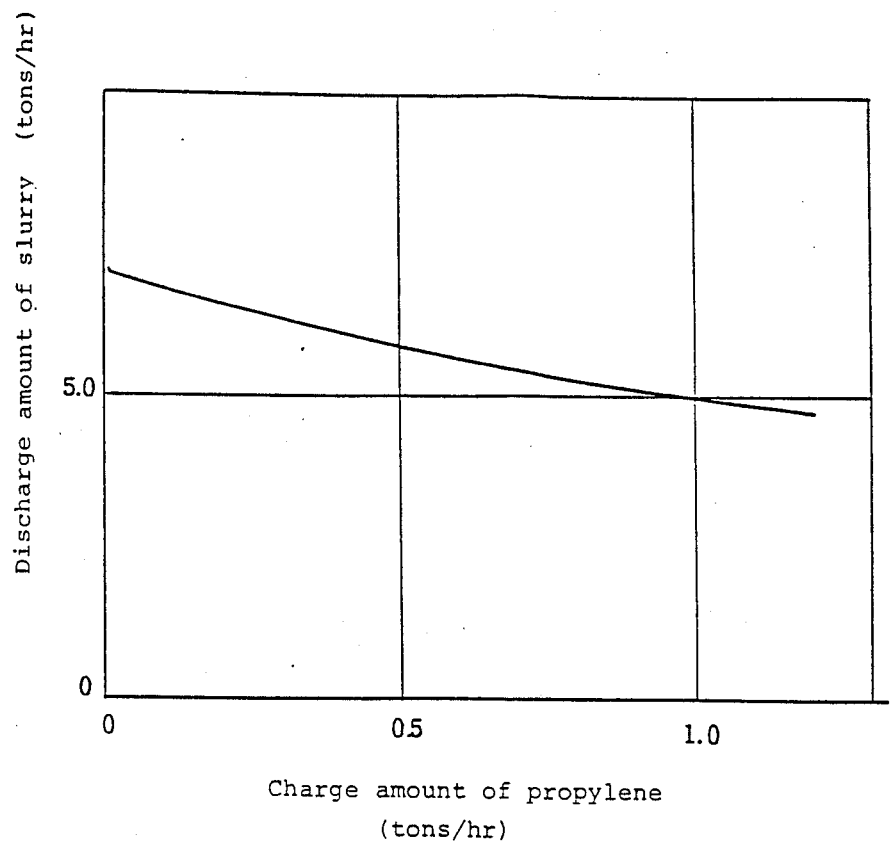
FIG. 2 is a drawing showing the relation between the charge amount of the liquid propylene and the discharge amount of the slurry.

In the aforementioned Comparative Example, the liquid propylene is charged through the line (12 in an amount 1.2 tons/hr concurrently with the reduction of the number of the heating jackets from 6 to 5. By determining the discharge amount of the slurry relative to the varied amount of the propylene as charged into the system, it has been found that the discharge amount of the slurry continuously increases as the charge amount of the propylene is decreased, and the discharge amount of the slurry reaches 7.0 tons/hr when the charge amount of the propylene is zero. The quantitative relation between the discharge amount of the slurry and the charge amount of the propylene is shown in FIG. 2 of the drawings.

To summarize the principals of the present invention, the control of the amount of discharge of the slurry is maintained by balancing of the pressure in the zone where the slurry comes from, i.e. vessel 1 in FIG. 1 and the pressure in the heat piping. The amount of the slurry and the hydrocarbon or halogenated hydrocarbon introduced into the second heating zone for maintaining the pressure in the heat tube constant, varies in accordance with a number of the jackets to which the steam is introduced. Namely, as the number of jackets to which the steam is introduced is decreased, the amount of slurry necessary for balancing the pressure in the heat piping is increased and so eventually the amount of slurry to be discharged is increased. That is, as the number of heating jackets is decreased, the pressure in the heat piping is decreased and more slurry is discharged into the heat piping to balance the pressure. This variation in the amount of slurry to be discharged, however, occurs in a stepwise manner, owing to the stepwise change of a variety of heating jackets to which steam is introduced, which number could vary anywhere from 2 to 10 or more, preferably a total of about 3 to 5 or more in the smaller diameter portion of the heat piping as shown in FIG. 1.

By separately introducing the hydrocarbon or halogenated hydrocarbon into the heat piping in accordance with the present invention, the amount of slurry to be discharged can be varied continuously or linearly as desired. This is because the balancing of the pressures between the vessel 1 and the heating tube can be achieved by the fine tuning effect of controlling the amount of heating jackets in operation as well as the amount of hydrocarbon or halogenated hydrocarbon introduced into the heat tube to control the pressure differential between vessel 1 and the heat tube so that the discharge of the slurry can be conducted on a continuous basis.

To shown how the present invention operates in principal, taken into consideration the comparative example of the present application, the relationship between the number of heating jackets to which steam is introduced and the amount of slurry to be discharged (which is equal to the reduced amount of slurry in tank 1 of FIG. 1) is as follows:

| Number of heating jackets | Amount of slurry to be discharged |
| --- | --- |
| 6 | 4.9 tons/hr |
| 5 | 7.0 |
| 4 | 8.6 |
| 3 | 9.3 |

| Number of heating jackets | Amount of slurry to be discharged |
| --- | --- |
| 2 | 10.3 |

It can be seen by the above that the amount of slurry to be discharged varies depending on the number of jackets. If one desired to discharge the slurry in the above situation in an amount of 6 tons/hr, it would be impossible to make use of the apparatus as it is in example 1. However, if propylene is introduced as in the example of the present invention in an amount of 0.4 tons/hr separately introduced as in FIG. 1, the amount of discharge of the slurry will be 6.0 tons/hr as shown in FIG. 2. The total discharge amount from line 11 in this case would be substantially equal to 6.0 plus 0.4 which equals 6.4 tons/hr. Thus, by varying the amount of heating jackets and simultaneously controlling the separate introduction of the gaseous component into the heat zone to control the pressure, the amount of slurry can be leveled out, even when the number of heating jackets are decreased, i.e. the amount of steam supplied to the various jackets is decreased. According to the scheme above, the amount of discharge can still be controlled along continuously desired and prearranged levels by determining the amount of propylene introduced as in the instant case. Thus, the present invention represents a distinct advance over the fundamental mechanism in U.S. Pat. No. 4,126,743 and indeed by the simultaneous control of the number of heating jackets and the hydrocarbons and halogenated hydrocarbons separately introduced into the heating zone, the amount of discharge of slurry can be very strictly and finely controlled, which has been heretofore impossible.

What we claim is:

1. A process for continuously discharging a slurry which comprises:
   (a) transferring a slurry of solid polymer particles and a diluent from a first zone maintained under pressures sufficient for holding said diluent in the liquid phase, into a heat piping, said heat piping consisting of a heat tube covered with two or more divisional heating jackets, said diluent consisting of at least one hydrocarbon or halogenated hydrocarbon which are gaseous under normal temperature and pressure, and,
   (b) subsequently separating and recovering the substantially dried solid polymer particles and the vapor of the evaporated diluent from a second zone substantially maintained under atmospheric pressure, the improvement wherein the amount of discharge of the slurry is controlled by means of:
   (i) varying the number of the heating jackets in which steam is introduced, and
   (ii) separately introducing and controlling the amount of a liquid hydrocarbon or halogenated hydrocarbon into the heat tubing, said liquid hydrocarbon and halogenated hydrocarbon being gaseous at normal temperature and under normal pressure.

2. A process according to claim 1 in which the heat tubing is made up of a larger inner diameter portion and a smaller inner diameter portion wherein the smaller inner diameter portion is located closest to the first zone from which the slurry is transferred and the ratio of the different diameters is 1.2–3.0.

3. A process according to claim 2 in which the smaller inner diameter portion is surrounded by a series of two or more heating jackets making up several subdivided heating zones within the small diameter portion.

4. A process according to claim 3 wherein the pressure is controlled within the heat piping by simultaneously modulating the amount of heating jackets in operation and the amount of hydrocarbons or halogenated hydrocarbons separately introduced into the heat piping such that a predetermined amount of slurry discharge is strictly controlled on a continuous and predetermined basis.

* * * * *